(12) United States Patent
Eshghi et al.

(10) Patent No.: US 8,429,216 B2
(45) Date of Patent: Apr. 23, 2013

(54) GENERATING A HASH VALUE FROM A VECTOR REPRESENTING A DATA OBJECT

(75) Inventors: Kave Eshghi, Los Altos, CA (US); Shyam Sundar Rajaram, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1247 days.

(21) Appl. No.: 12/235,905

(22) Filed: Sep. 23, 2008

(65) Prior Publication Data

US 2010/0077015 A1 Mar. 25, 2010

(51) Int. Cl.
*G06F 17/14* (2006.01)
(52) U.S. Cl.
USPC .......... 708/400; 708/401; 382/190; 382/251; 382/209; 382/219
(58) Field of Classification Search ................... 708/400, 708/401; 382/209, 219, 251, 190
See application file for complete search history.

(56) References Cited

U.S. PATENT DOCUMENTS

| | | | |
|---|---|---|---|
| 6,528,974 B1 * | 3/2003 | Mirov et al. | 323/267 |
| 6,839,680 B1 | 1/2005 | Liu et al. | |
| 6,907,527 B1 * | 6/2005 | Wu | 713/176 |
| 7,647,331 B2 * | 1/2010 | Li et al. | 382/218 |
| 7,890,549 B2 * | 2/2011 | Elad et al. | 707/803 |
| 8,055,078 B2 * | 11/2011 | Choi et al. | 382/209 |
| 2003/0101449 A1 | 5/2003 | Bentolila et al. | |
| 2008/0126176 A1 | 5/2008 | Iguchi | |
| 2010/0027895 A1 * | 2/2010 | Noguchi et al. | 382/224 |
| 2010/0030780 A1 | 2/2010 | Eshghi | |

OTHER PUBLICATIONS

Gionis, Aristides et al., "Simirar[ty Search in High Dimensions via Hashing," Proceedings of the 25th VLDB Conference, 1999, Edinburgh, Scotland, pp. 518-529.*
Ahmed et al., "Discrete Cosine Transform," IEEE Trans. Computers, pp. 90-93 (Jan. 1974).
U.S. Appl. No. 61/084,986, entitled "Identifying Related Objects in a Computer Database," filed Jul. 30, 2008.
M.S. Charikar, "Similarity Estimation Techniques from Rounding Algorithms," STOC'02, 9 pages, May 19-21, 2004.
Wolfram MathWorld, "Hadamard Matrix," http://mathworld.wolfram.com/HadamardMatrix.html, 13 pages (at least as early as May 14, 2008).
Wikipedia, "Discrete Cosine Transform," http://en.wikipedia.org/wiki/Discrete_cosine_transform, 9 pages (at least as early as May 14, 2008).
Wikipedia, "Hadamard Matrix," http://en.wikipedia.org/wiki/Hadamard_matrix, 6 pages (at least as early as May 14, 2008).
Fenstermacher et al.; "Mining Client-Side Activity for Personalization" Department of Management Information Systems, Eller College of Business and Public Administration, University of Arizona, Jun. 2002.

(Continued)

*Primary Examiner* — Tammara Peyton

(57) ABSTRACT

To generate at least one hash value for a feature vector that represents a data object, a discrete orthogonal transform is applied on a second vector produced from the feature vector. Applying the discrete orthogonal transform on the second vector produces a third vector. At least one value is selected from the third vector to produce the hash value. The at least one hash value is used to perform an action.

19 Claims, 2 Drawing Sheets

OTHER PUBLICATIONS

Baoyao, Zhou; "Intelligent Web Usage Mining" Nanyang Technological University, Division of Information Systems, School of Computer Engineering, 2004.

Baynote Inc.: The Collective Intelligence Platform, Online, http://www.baynote.com/technology/platform/2010.

Hottolink Inc.; "Recognize" Online, http://www.hottolink.co.jp/english/reconize.html, 2009.

Andrejko et al.: User Characteristics Acquisition from Logs with Semantics 8. Slovak University of Technology in Bratislava.

Hongjun Lu et al: Extending a Web Browser with Client-Side Mining, Hong Kong University of Science and Technology Department of Computer Science, Clear Water Bay, Kowloon, Hong Kong, China, 2003.

Shankar et al.; "Personalized Web Search Based on Client Side Ontology", CS 498: B.Tech Project, 10. IIT Kanpur, India 2010.

Sendhikumar et al.; "Personalized ontology for web search personalization" 1. Anna University, Chennai, India , 2008.

Shahabi et al.; "Yoda an Accurate and Scalable Web based Recommendation System?" University of Southern California, Los Angeles, Sep. 2001.

Why WUBAT? Website User Behavior & Analysis Tool, Wubat, Online, http://www.wubat.com/.

Claypool et al.; "Implicit Interest Indicators", 14. Worcester Polytechnic Institute, Worcester, Computer Science Department Worcester Polytechnic Institute Worcester, MA 01609, USA., 2001.

Shahabi et al.; A Framework for Efficient and Anonymous Web Usage Mining Based on Client-Side Tracking, 15. University of Southern California, Los Angeles, 2002.

Chattertrap; ONLINE http://www.chattertrap.com; Jul. 20, 2010.

HSNW: SRI defense technology spawns civilian application: published Jun. 29, 2010.

Anthony Ha: Facebook investor backs Chattertrap, a personal assistant for content, Jun. 28, 2010.

* cited by examiner

GENERATING A HASH VALUE FROM A VECTOR REPRESENTING A DATA OBJECT

BACKGROUND

Large numbers of data objects (e.g., text documents, image files, etc.) can be stored in databases or other storage structures. A task that can be performed with respect to such stored data objects is similarity-based retrieval, in which one or more data objects similar to other data object(s) are identified. Examples of applications that utilize similarity-based retrieval include similarity-based image retrieval (where one or more images that are similar to a query image are retrieved), copyright violation detection (to detect whether use or copying of a particular data object is authorized), or other applications.

Traditionally, a data object (e.g., text document, image file, and so forth) can be represented by a set of one or more feature vectors, where a feature vector can include aspects of the data object that is being represented. For example, a feature vector for a text document can be a bag (collection) of certain words that appear in the text document. An image file can be associated with a relatively large number of feature vectors (e.g., hundreds of feature vectors), where each feature vector of the image file represents some different aspect of the image file.

Two data objects are deemed to be similar if the feature vector(s) of a first data object is (are) similar to the feature vector(s) of a second data object, according to some measure (e.g., cosine similarity measure). However, comparing a relatively large number of vectors for the purpose of performing similarity-based retrieval can be computationally very expensive and inefficient.

BRIEF DESCRIPTION OF THE DRAWINGS

Some embodiments of the invention are described, by way of example, with respect to the following figures.

DETAILED DESCRIPTION

Figure 1:
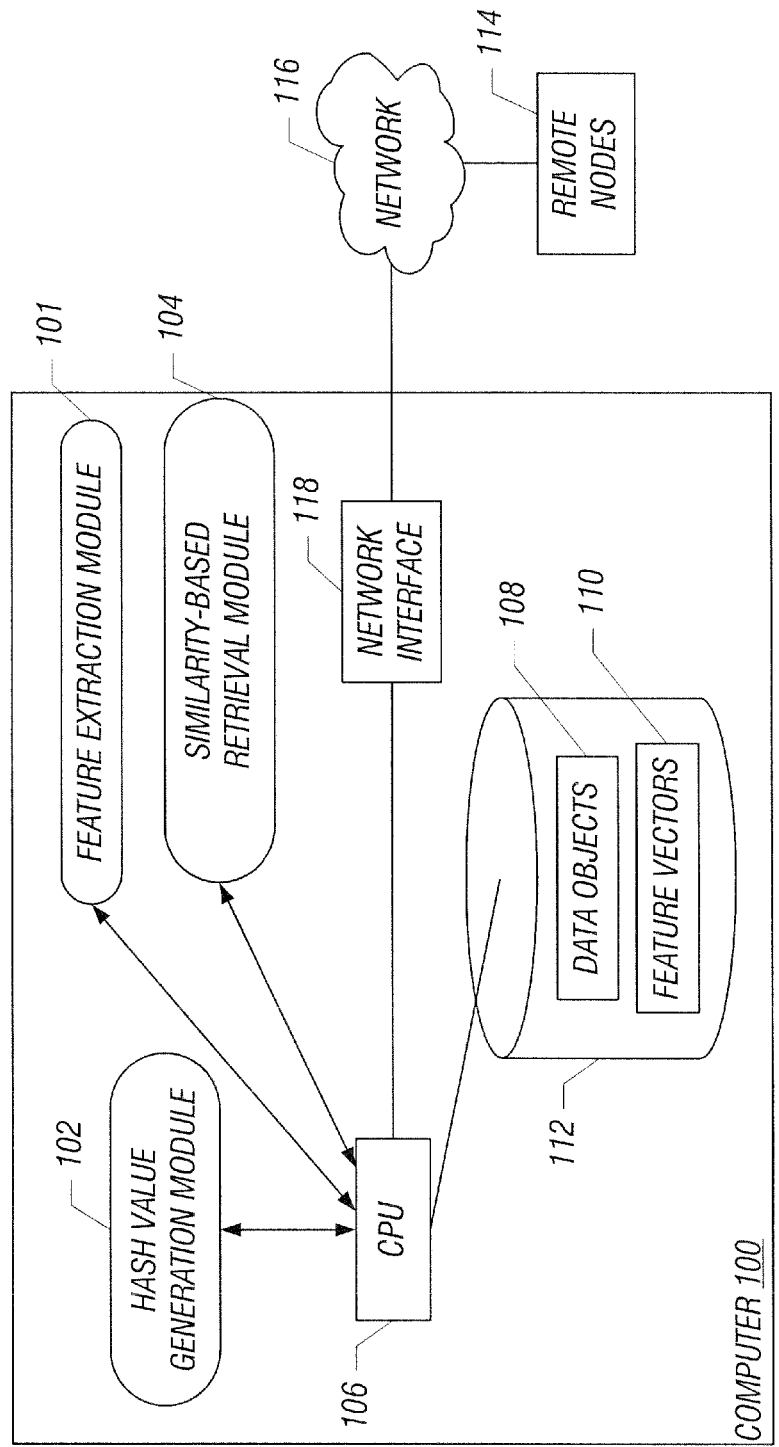
FIG. 1 is a block diagram of an exemplary arrangement that includes computer that incorporates an embodiment of the invention.

In accordance with some embodiments, at least one feature vector is extracted from a data object, where the feature vector is representative of some aspect of the data object. In some implementations, a data object can be associated with one feature vector. In other implementations, a data object can be associated with multiple feature vectors. For example, a text document is typically associated with just one feature vector, which can be made up of a bag (collection) of words. An image file, such as a photograph, can be associated with a relatively large number of feature vectors. Other types of data objects that can be associated with feature vectors include audio files, video files, directories, software executable files, and so forth.

A feature vector (or more simply, a "vector") can be made up of a collection of elements, such as a sequence of real numbers. In accordance with some embodiments, a hash value (or multiple hash values) is (are) generated from this vector. The generated hash values for corresponding feature vectors (that represent respective data objects) enable more efficient identification of similar data objects in similarity-based retrieval, since the hash values that are compared are typically smaller in size than the corresponding feature vectors and only exact hash value matches have to be considered.

In some embodiments, the generation of a hash value is accomplished by applying a permutation to the collection of elements in the feature vector. Applying a permutation refers to changing the position of some or all the elements in the vector, without changing their value. For example, a feature vector may have elements 1, 2, 3, 4, 5, in that order. Applying a permutation would result in a vector where the same elements are present, but in a possibly different order. One such permutation is 2, 1, 3, 5, 4.

Applying the permutation to the collection of elements in the feature vector produces a second vector (permuted vector) that contains the permuted sequence of elements from the feature vector. Next, a discrete orthogonal transform is applied on the permuted vector. Examples of the discrete orthogonal transform include a discrete cosine transform, discrete Fourier transform, Hadamard transform, a discrete sine transform, and so forth. Mathematically, a discrete orthogonal transform corresponds to the matrix multiplication of a vector v with a discrete orthogonal matrix M. Using specialized algorithms, many discrete orthogonal transforms can be performed in N log(N) steps, where N is the size of the vector, whereas performing the multiplication explicitly would take $N^2$ steps.

A discrete cosine transform (DCT) expresses a sequence of data points in terms of a sum of cosine functions at different frequencies. DCT is a Fourier-related transform that is similar to a discrete Fourier transform, but using only real numbers. A discrete Fourier transform (DFT) transforms a first function (typically in the time domain) to a second function in the frequency domain. A Hadamard transform decomposes an input vector into a superposition of Walsh functions. A discrete sine transform is equivalent to the imaginary part of a DFT.

Applying the discrete orthogonal transform on the permuted vector produces a third vector (transform vector). A value is selected from the transform vector, and its index is used as the hash value. The selected value can be an extremum value (e.g., maximum value or minimum value) from the elements in the transform vector, or some other value from the transform vector. The index of the selected value is the hash value for the feature vector. The hash values corresponding to the feature vectors can then be provided in a reverse index to enable the ability to find feature vectors that are most similar to a query vector (a vector specified in a query) using index lookup. Index lookup refers to a process in which an index value (a hash value) is used to identify an entry of the reverse index, where the entry contains the feature vector corresponding to the hash value.

Although the foregoing has referred to generating one hash value from a corresponding feature vector, a modified form of the procedure generally discussed above can be used to produce multiple hash values from a corresponding feature vector, as discussed in further detail below.

FIG. 1 illustrates an exemplary arrangement that includes a computer 100 that has various software modules according to some embodiments. The software modules include a hash value generation module 102 for producing one or more hash values for each feature vector that is associated with a data object. The computer 100 also includes a similarity-based retrieval module 104 to perform similarity-based retrieval using the generated hash values. Examples of applications that employ similarity-based retrieval include similarity-based file retrieval (in which one or more files similar to a query file are retrieved), copyright violation detection (to detect whether access of a file or files is permitted), document searching (identifying a document in response to a search request), and so forth. More generally, similarity-based retrieval refers to identifying and retrieving data object(s) that are similar, according to some predefined similarity measure (e.g., cosine similarity measure), to one or more other data object(s).

The computer 100 also includes a feature extraction module 101 to extract feature vectors (110) from corresponding data objects (108). Some of the data objects 108 can each be associated with just one feature vector 110. Some other data objects can each be associated with multiple feature vectors 110. The data objects 108 and associated feature vectors are stored in a storage subsystem 112.

The feature extraction module 101, hash value generation module 102, and similarity-based retrieval module 104 are executable on one or more central processing units (CPUs) 106. The CPU(s) 106 is (are) connected to the storage subsystem 112 to enable retrieval of the data objects 108 and feature vectors 110 stored in the storage subsystem 112. The storage subsystem 112 can be implemented with one or more multiple storage devices (e.g., disk-based storage devices, integrated circuit storage devices, etc.).

Note that although the feature extraction module 101, hash value generation module 102, and similarity-based retrieval module 104 are depicted as being executable on the same computer 100, it is noted that such software modules can be executed on different computers. The computer 100 can be a server computer that is accessible over a data network 116 by any one of multiple client computers, such as remote nodes 114 depicted in FIG. 1. The computer 100 also includes a network interface 118 to enable communication over the data network 116.

Figure 2:
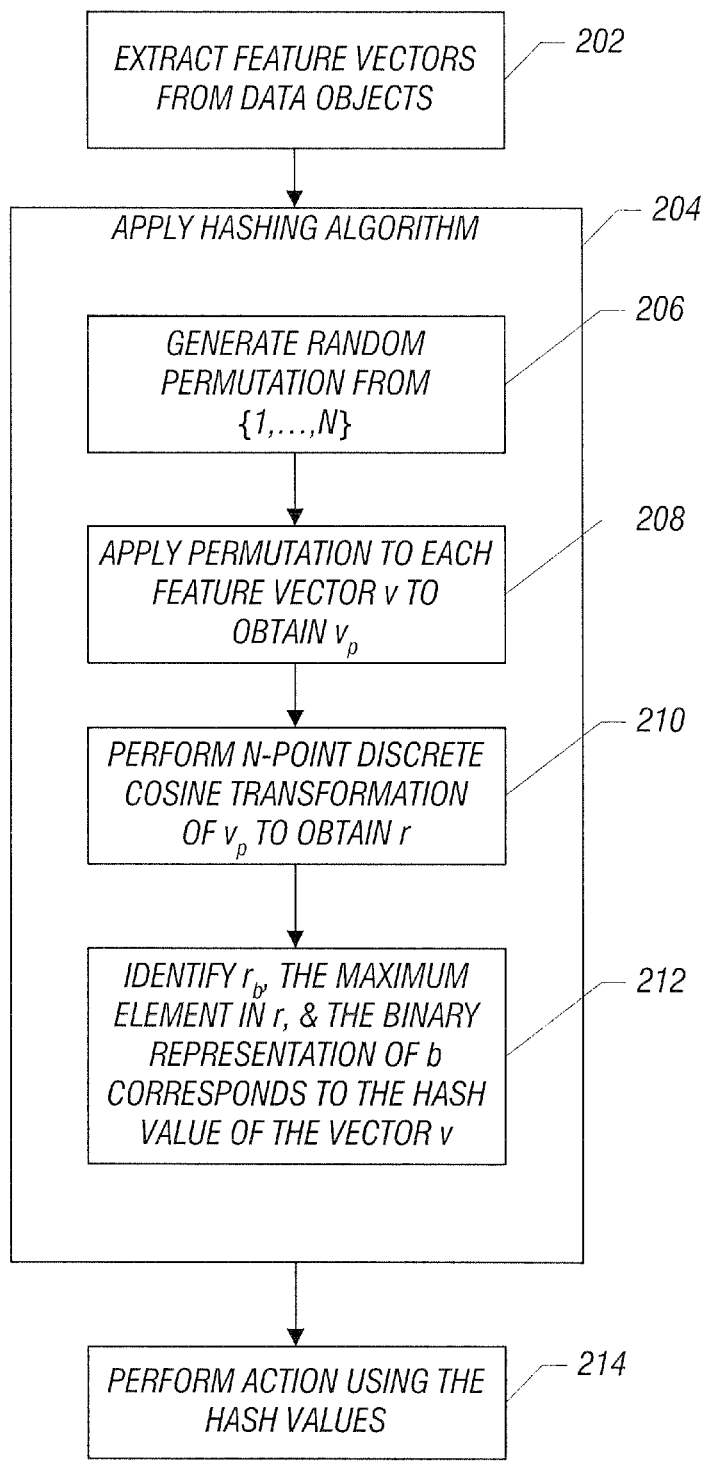
FIG. 2 is a flow diagram of a process of generating and using a hash value for a data object, in accordance with an embodiment.

FIG. 2 illustrates a procedure performed according to an embodiment. Initially, feature vectors can be extracted (at 202) from data objects stored in a storage subsystem (e.g., 112 in FIG. 1). The feature vector extraction can be performed by the feature extraction module 101 of FIG. 1.

Next, after feature vector extraction, a locality sensitive hashing algorithm can be applied (at 204), in accordance with an embodiment. Locality sensitive hashing maps each feature vector to a small set of one or more hashes $\{h_1, h_2, \ldots, h_m\}$ in such a way that if two feature vectors are close according to a given similarity measure, with high probability their hash sets overlap strongly, and if the two vectors are dissimilar according to a given similarity measure, with high probability their hash sets are disjoint. The locality sensitive hashing algorithm generates a hash value (or multiple hash values) for each feature vector.

The hashing algorithm 204 includes tasks 206, 208, 210, and 212 in FIG. 2. A feature vector is represented as v, and the feature vector contains N (N≧1) elements (e.g., N real numbers). The N elements of the feature vector v are associated with corresponding positions $\{1, \ldots, N\}$. Next, a random permutation from $\{1, \ldots, N\}$ is generated (at 206). A first exemplary permutation from $\{1, \ldots, N\}$ would be $\{5, 3, 2, 7, \ldots\}$. A second exemplary permutation from $\{1, \ldots, N\}$ would be $\{N, 1, 7, 6, \ldots\}$. Each permutation is thus a different sequence of the original elements in the original sequence $\{1, \ldots, N\}$.

The generated permutation is applied (at 208) to the feature vector v. Applying the exemplary permutation $\{5, 3, 2, 7, \ldots\}$ to feature vector v means that a sequence of elements from feature vector v is selected where the first element selected would be the element at position 5 of the feature vector v, the second element selected from feature vector v would be the element from position 3 of v, the third element selected from feature vector v would be the element from position 2, and so forth. Note that the same random (or predetermined) permutation is applied to each of the feature vectors corresponding to data objects maintained in the storage subsystem 112 so that the hash values for different feature vectors are generated in a consistent manner to enable meaningful comparison. In other words, if permutation $\{5, 3, 2, 7, \ldots\}$ is applied to a first feature vector, then the same permutation would be applied to all other feature vectors.

Applying the permutation to each feature vector v causes a corresponding permuted vector $v_p$ to be generated. The permuted vector $v_p$ contains elements of feature vector v in the order specified by the applied permutation.

Next, a discrete orthogonal transform, such as an N-point discrete cosine transform, is performed (at 210) on $v_p$ to obtain transform vector r. An N-point discrete cosine transform is a discrete cosine transform applied on an input vector of length N. The output of the discrete cosine transform is the output vector, r, of the same length as the permuted vector $v_p$. Alternatively, instead of a discrete cosine transform, other discrete orthogonal transforms can be applied, including a Hadamard transform, a discrete Fourier transform, a discrete sine transform, and so forth.

The output transform vector r contains N elements (assuming that the permuted vector $v_p$ also contains N elements). An extrema element (either a maximum element or minimum element) can be identified (at 212), where the extrema element is represented as $r_b$. Alternatively, instead of identifying an extrema element from r, an element from r can be selected using another criterion. The identified element $r_b$ is the element located at position b in the transform vector r. The value of b thus represents the position of $r_b$. In one embodiment, a binary representation of b (the position of $r_b$ (in r) corresponds to the hash value of the feature vector v. In other embodiments, some other representation of b or $r_b$ can be used as the hash value.

The tasks 206-212 are reperformed for all other feature vectors in the storage subsystem (112 in FIG. 1) to obtain corresponding hash values.

By applying the hashing algorithm (204), corresponding sets of one or more hash values are produced for respective feature vectors. Note that in some embodiments, each set contains just one hash value generated from a corresponding feature vector. Alternatively, each set can contain multiple hash values generated from a corresponding feature vector.

In one example, if a set of multiple hash values is desired for a particular feature vector, instead of identifying just the maximum value in r, the top highest n (n>1) values can be selected, where n represents the number of hash values desired for each feature vector. Alternatively, the lowest n values can be identified from the output vector r. Thus, the positions corresponding to the top n values or lowest n values from r can be used to provide the corresponding hash values for a respective feature vector.

In another embodiment, the positions of the largest element of r and the smallest element of r can be used as two independent hashes for the same vector.

Once the hash values for the feature vectors have been produced, one or more actions can be performed (at 214) using the hash values. For example, a reverse index can be generated, where the reverse index is an index from hash values to corresponding feature vectors. Given an input hash value or group of hash values (such as for feature vector(s) specified in a query), similar feature vectors representing corresponding data objects can be identified using the reverse index in a relatively quick manner by using index lookup. For example, a query can specify an input vector $v_1$, in which case the corresponding hash value(s) is (are) identified and an index lookup using the hash value(s) into the reverse index can be performed to identify similar feature vector(s) contained in the reverse index.

Using the algorithm discussed above, the length (h) of a hash value is as follows: $h=\log_2(N)$, where N represents the number of elements in a feature vector. However, if it is desired to have a hash length that is larger than h, the feature vector can be made bigger by repeating the feature vector. For example, if it is desired to have a hash length of h+1, then the size of the feature vector is doubled by repeating the feature vector twice. The repeating operation is performed before application of the permutation, so that the permuted vector would be the size of the repeated vector (twice the size of a single feature vector).

If it is desired to have a hash length that is smaller than h, then the opposite can be performed. First, the permutation can be applied to the feature vector, and then the permuted vector is shortened. Thus, if it is desired to have h−1 hash bits, then permutation is first applied to the feature vector. Next, the discrete cosine transform is applied to just one half of the permuted vector.

When the size of the feature vector is increased (by repeating it), the cosine similarity between two vectors is retained even after the permutation and concatenation or scale down steps. However, decreasing the size of the feature vector by cutting the permuted vector results in an approximation of the cosine similarity between the original vectors.

In a further embodiment, the first element (the so-called "DC" element) in the DCT or Hadamard transform can be ignored. Mathematically, this is equivalent to first normalizing the vector around the mean.

By using techniques according to some embodiments, computational efficiency is enhanced when attempting to identify similar data objects since hash values are compared, rather than layer feature vectors. The hash values are generated based on applying a discrete orthogonal transform, which is associated with higher recall and better precision.

Instructions of software described above (including the feature extraction module 101, hash value generation module 102, and similarity-based retrieval module 104 of FIG. 1) are loaded for execution on a processor (such as one or more CPUs 106 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. The A method executed by a computer, comprising:
    generating at least one hash value for a feature vector that represents a data object, wherein generating the at least one hash value comprises:
        applying a permutation to a collection that includes elements in the feature vector to obtain a second vector;
        applying a discrete orthogonal transform on the second vector, wherein applying the discrete orthogonal transform on the second vector produces a third vector; and
        selecting at least one value from the third vector to produce the hash value; and
    using the at least one hash value to perform an action.

2. The method of claim 1, wherein the data object is a first data object, and wherein performing the action comprises performing similarity based retrieval of a second data object using the at least one hash value.

3. The method of claim 2, wherein performing the similarity based retrieval of the second data object comprises:
    accessing a reverse index that maps hash values to feature vectors, wherein the at least one hash value is used to retrieve at least one corresponding feature vector from the reverse index, the retrieved at least one feature vector corresponding to the second data object.

4. The method of claim 1, wherein applying the discrete orthogonal transform comprises applying a transform selected from among:
    a discrete cosine transform, discrete Fourier transform, Hadamard transform, and discrete sine transform.

5. The method of claim 1, wherein selecting the at least one value from the third vector comprises identifying an index of an extremum value from the third vector.

6. The method of claim 1, wherein selecting the at least one value from the third vector comprises selecting a maximum value and a minimum value from the third vector,
    wherein hash values corresponding to the feature vector are produced from the maximum and minimum values.

7. The method of claim 1, wherein selecting the at least one value from the third vector comprises selecting the highest or lowest n, n>1, values from the third vector, wherein hash values corresponding to the feature vector are produced from the highest or lowest n values.

8. The method of claim 1, wherein generating the at least one hash value further comprises:
    identifying a position of the selected value from the third vector; and
    producing the hash value based on the identified position.

9. The method of claim 8, wherein producing the hash value based on the identified position comprises using a binary representation of the position as the hash value.

10. A method executed by a computer, comprising:
    generating at least one hash value for a feature vector that represents a data object, wherein generating the at least one hash value comprises:

repeating the feature vector multiple times, wherein the elements of the repeated feature vectors make up a collection of elements;

applying a permutation to the collection of elements to obtain a second vector, wherein repeating the feature vector multiple times before applying the permutation enables a length of the hash value to be increased;

applying a discrete orthogonal transform on the second vector, wherein applying the discrete orthogonal transform on the second vector produces a third vector; and selecting at least one value from the third vector to produce the hash value; and using the at least one hash value to perform an action.

11. The method of claim 1, wherein applying the discrete orthogonal transform on the second vector comprises applying the discrete orthogonal transform to a part of the second vector to reduce a length of the hash value.

12. A method executed by a computer, comprising:

generating hash values for corresponding feature vectors that represent corresponding data objects, wherein generating each of the hash values for a respective one of the feature vectors comprises:
applying a permutation to a collection that includes elements in the feature vector to obtain a second vector;
applying a discrete orthogonal transform on the second vector to produce a third vector, and
selecting a value from the third vector, wherein the hash value is generated from the selected value.

13. The method of claim 12, further comprising:

building an index that indexes hash values to corresponding feature vectors; and performing similarity-based retrieval using the index, the similarity-based retrieval including retrieving corresponding feature vectors from the index using the generated hash values.

14. An article comprising at least one computer-readable storage medium containing instructions that when executed cause a computer to:

generate at least one hash value for a feature vector that represents a data object, wherein generating the at least one hash value comprises:
applying a permutation to a collection that includes elements in the feature vector to obtain a second vector;
applying a discrete orthogonal transform on the second vector, wherein applying the discrete orthogonal transform on the second vector produces a third vector; and
selecting at least one value from the third vector to produce the hash value; and
using the at least one hash value to perform an action.

15. An article comprising at least one computer-readable storage medium containing instructions that when executed cause a computer to:

generate at least one hash value for a feature vector that represents a data object, wherein generating the at least one hash value comprises:
repeating the feature vector multiple times, wherein the elements of the repeated feature vectors make up a collection of elements;
applying a permutation to the collection of elements to obtain a second vector, wherein repeating the feature vector multiple times before applying the permutation enables a length of the hash value to be increased;
applying a discrete orthogonal transform on the second vector, wherein applying the discrete orthogonal transform on the second vector produces a third vector; and
selecting at least one value from the third vector to produce the hash value; and
using the at least one hash value to perform an action.

16. The article of claim 14, wherein generating the at least one hash value further comprises:

identifying a position of the selected value from the third vector; and using a representation of the position as the hash value.

17. A system comprising:

at least one processor to:
generate at least one hash value for a feature vector that represents a data object, wherein generating the at least one hash value comprises:
applying a permutation to a collection that includes elements in the feature vector to obtain a second vector;
applying a discrete orthogonal transform on the second vector, wherein applying the discrete orthogonal transform on the second vector produces a third vector; and
selecting at least one value from the third vector to produce the hash value; and
use the at least one hash value to perform an action.

18. The system of claim 17, wherein applying the permutation comprises changing a position of at least one of the elements in the collection.

19. The method of claim 1, wherein applying the permutation comprises changing a position of at least one of the elements in the collection.

* * * * *

UNITED STATES PATENT AND TRADEMARK OFFICE
CERTIFICATE OF CORRECTION

PATENT NO. : 8,429,216 B2
APPLICATION NO. : 12/235905
DATED : April 23, 2013
INVENTOR(S) : Kave Eshghi et al.

Page 1 of 1

It is certified that error appears in the above-identified patent and that said Letters Patent is hereby corrected as shown below:

In the Claims:

In column 6, line 14, in Claim 1, delete "The A" and insert -- A --, therefor.

Signed and Sealed this
Thirteenth Day of August, 2013

Teresa Stanek Rea
*Acting Director of the United States Patent and Trademark Office*